March 31, 1964     SHOSHICHI KUBOTA     3,126,866
ANIMAL CAGE WITH FEED AND WATER SUPPLY MEANS
Filed Jan. 5, 1961     3 Sheets-Sheet 1
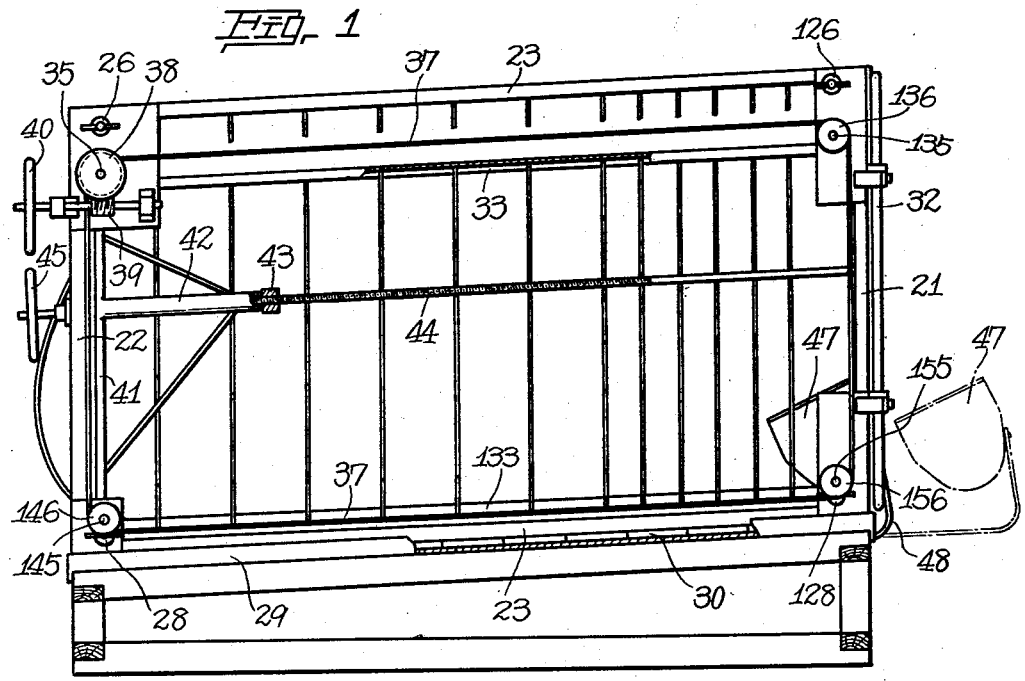
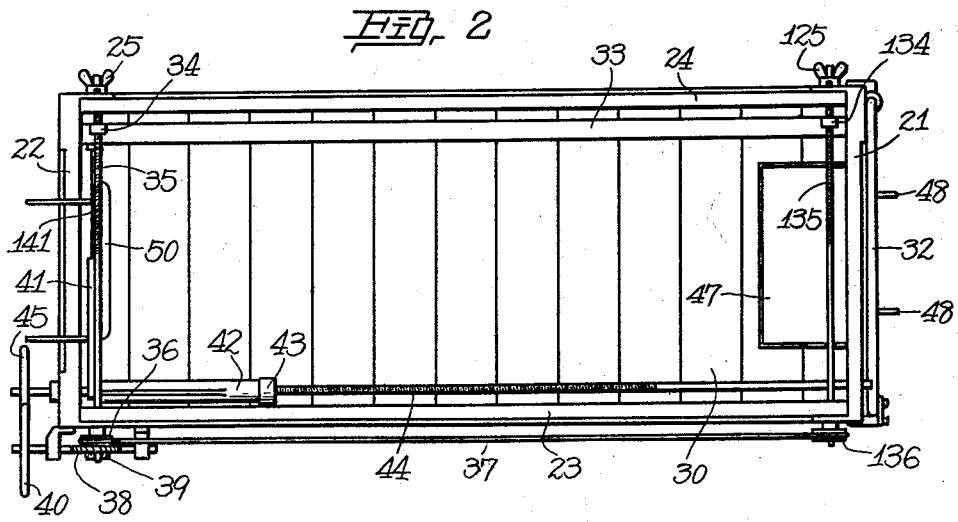
INVENTOR.
Shoshichi Kubota
BY Michael S. Striker
Attorney

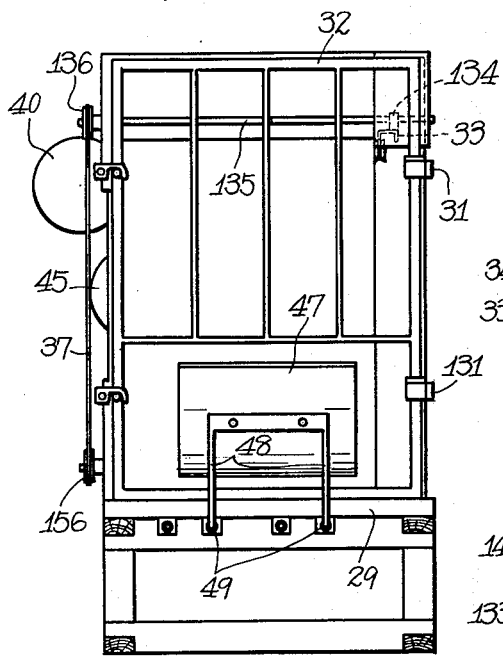
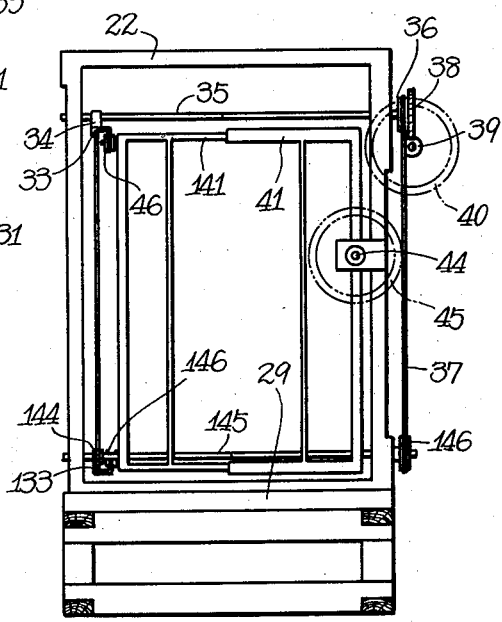
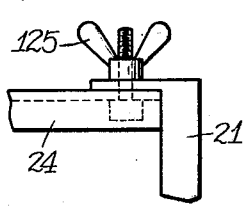
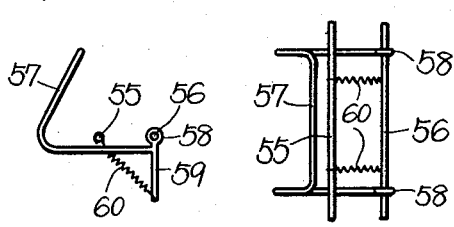
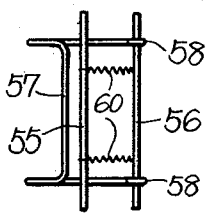
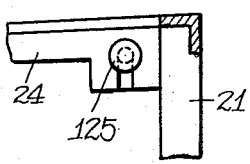

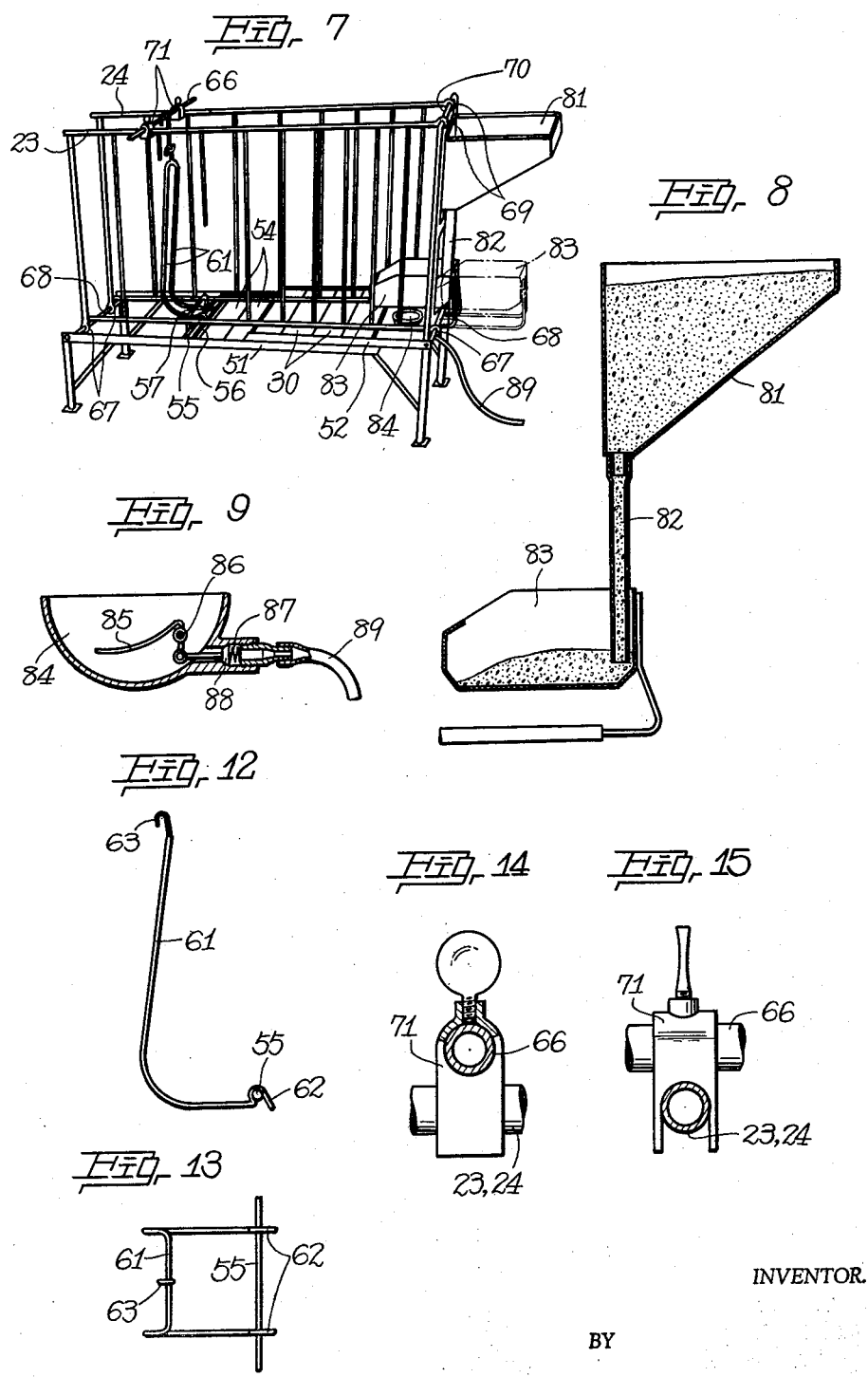

United States Patent Office 3,126,866
Patented Mar. 31, 1964

3,126,866
ANIMAL CAGE WITH FEED AND WATER SUPPLY MEANS
Shoshichi Kubota, 1349 Oaza Mameshima, Nagano-shi, Japan
Filed Jan. 5, 1961, Ser. No. 80,811
Claims priority, application Japan Jan. 8, 1960
8 Claims. (Cl. 119—18)

This invention relates to an improvement in a method of raising pigs, particularly to a method of raising pigs in cages and pig raising cages therefor.

Heretofore, raising pigs has been done by the flat pigsty with the greatest number to be raised being one pig per 18 square feet, and required much manual labour. Infectious and parasitic diseases have been menaces to the pig raising.

One object of this invention is to provide a method of raising pigs in a limited space intensively.

Another object of this invention is to provide a method of raising pigs being automatic as far as possible.

Still another object of this invention is to provide a method of raising pigs being extremely hygienic.

Further another object of this invention is to provide a method of raising pigs whereby the pigs can be raised well-fed and fat within a short period of time with a comparatively small amount of feed.

A further object of this invention is to provide a method of raising pigs whereby the pigs may be weighed very easily.

A further object of this invention is to provide a method of raising pigs whereby the pigs may be conveyed very easily.

A further object of this invention is to provide a method of raising pigs whereby the pigs may be inspected very easily.

A further object of this invention is to provide a method of raising pigs whereby the pigs are made gentle.

It is also another object of this invention to provide pig raising cages whereby the method of raising pigs may be carried out.

It is also still another object of this invention to provide pig raising cages for carrying out the method which is easily assembled, disassembled, and conveyed.

According to the present invention, the pig raising is effected by means of a pig raising cage. That is, a pig raising cage comprising a front frame, a left frame, a right frame, a base frame, and an escape preventing means. The base frame carries a floor board sloping up to the front. The left frame is movable to the right frame. The escape preventing means is movable to the front. The space inside the cage is narrowed by moving the left frame and the escape preventing means to be suitable to house a pig. The pig, with its head turned frontward, is pushed in the space and fed through the front frame. The space is enlarged in accordance with the growth of the pig.

The invention will be better understood and other objects and additional advantages of the invention will become apparent upon perusal of the following description taken in connection with the drawings in which:

FIG. 1 is a left side view of a pig raising cage embodying this invention;
FIG. 2 is a plan view thereof;
FIG. 3 is a front view thereof;
FIG. 4 is a rear view thereof;
FIG. 5 is a plan view drawn to an enlarged scale and showing the structure of a corner of the pig raising cage;
FIG. 6 is a side elevation thereof likewise drawn to an enlarged scale;
FIG. 7 is a perspective view of another pig raising cage embodying this invention;
FIG. 8 is an enlarged vertically sectional side elevation of an automatic dropping type feeder attached to the pig raising cage;
FIG. 9 is an enlarged vertically sectional side elevation of an automatic water supplier attached to the pig raising cage;
FIG. 10 is an enlarged side elevation of a foot stopper of the pig raising cage;
FIG. 11 is a plan view thereof;
FIG. 12 is an enlarged side elevation of an escape preventer of the pig raising cage;
FIG. 13 is a plan view thereof; and
FIGS. 14 and 15 show an assembling means for the pig raising cage.

Similar numerals refer to similar parts throughout the several views.

Referring more particularly to the drawings, the preferred embodiments of this invention will now be described; however, this description will be understood to be illustrative of the invention and not as limiting it to the particular construction shown and described.

There is a pig raising cage manufactured with iron frames. It is so constructed that at the end of each corner of the cage the front frame 21, the back frame 22, the left frame 23 and the right frame 24 can be easily assembled or disassembled with eight pieces of butterfly nuts 25, 125, 26, 126, 27, 127, 28, 128; it is fixed on the base frame 29 when assembled.

On this base frame 29 there is to be spread the floor board 30 each sticking together. On the front frame 21 of the cage there is to be attached an opening door 32 with the hinges 31, 131, and at the inside of the right frame 24 there is to be set up the movable lateral bars 33, 133. At the four corners of these bars the nuts 34, 134, 144, 154, are fixed, to which are attached screw bolts 35, 135, 145, 155, and at the one end of each are attached respectively the pulley 36, 136, 146, 156, and fixed; and to this pulley the wire rope 37 is to be hung so that it can be geared, and touched with the outside of the pulley 36 there is to be attached the worm wheel 38 and to the worm wheel 38 the worm 39 is to be geared with, and on the center of the worm 39 there is to be attached the round handle 40. At the same time on the outside of the cage's back frame 22 there is to be attached on the left side the movable back frame 41, and on the left side end of the movable back frame 41 there is to be attached a round tube 42 which is to be screwed in the nuts 43. On the other hand, the screw bolt 44 is to be screwed in to the nut 43 through the round tube 42, and at the rear end of the screw bolt 44 there is to be attached to round handle 45.

On the other hand, the movable back frame 141 on the right hand side is to be attached, and let the end of top and bottom frame be inserted and clasped to the end of the top and bottom tube-like frame of the above mentioned left side of the movable back frame 41; and at the same time at the right end of the top and bottom of the movable back frame 41, and hang the said groove wheel at the edge of the groove frame 33, 133 of the movable lateral frame so that it can be moved back and forth lightly.

At the bottom part of the front hinged door, by removing a small frame the feed bowl 47 is to be taken in and out, and attach a bracket 48 which is inserted so as to be freely fold-moved inside the supporting round tube 49 fitted in the bottom face of the bottom frame to support the feed bowl. On the floor of the back end of the cage, a hole 50 is to be drilled for passing urine, and the small frame-bar of the movable rear frame 41 is to be bent outward.

Moreover, the cage is so constructed as to look more or less a diamond shape if viewed from outside; and on setting, the cage is placed on the wooden base with the rear part slightly in the lower slope.

Now an explanation relates to the uses of this pig raising cage. First, the feed bowl 47 is drawn out. Turning the round handle, the pulley 46 is rotated by way of the worm gear 38, 39. The four screw bolts 35, 135, 145, 155 are turned by linking the wire rope 37 and the movable lateral frame 33, 133 are moved inside the cage. On this occasion, the frame-bar of the movable rear frame 141 clasped with the movable rear frame 41 will come inside of the tube-shaped frame-bar of the movable rear frame 41 being pushed by the movable lateral frame, since the groove wheel 46, 146 are hung on the edge of the top and bottom groove-shaped frame-bar 33 and 133. Next, by turning the round handle 45, the movable rear frame 41 is to be moved inside the cage by the screw bolt 44; and at the same time the movable rear frame 41 is to be moved inside together with the groove wheels 46, 146 which roll-move on the edge of the groove-shaped frame-bars 33, 133 of the movable lateral frame becoming as its rail.

Thus, the inside area of the cage will be appropriately narrowed to be suitable to house a pig: and opening the hinged door 32 a pig, with its head turned frontward, is pushed in and the door is closed, and the feed bowl 47 is inserted, with a changed position. Thus, in accordance with the growth of the pig the inside area of the cage is to be regulated by manipulating the rear round handles 40, 45, giving not only an appropriate limitation of motion to the pig but at the same time a certain habit to the pig's movement.

The following summary relates to the efficiency of using the cage:

(1) The inside area of this cage, in accordance with the growth of the pig, is to be appropriately regulated from time to time quite easily by the manipulation of the round handle, so that the cage not only can give a limitation to the pig's motion but also a certain habit to the pig's movement.

(2) Since the motion is limited, the pig can be raised well-fed and fat within a short period of time with a comparatively small amount of feed.

(3) The former pigsty becomes dirty with feces and urine, and a surprising amount of labor and time is needed for cleaning. But when this cage is used the pig, by its habit, moves rearward to make feces and urine by pressing its hip part to the movable rear frame 41, 141. Therefore, urine, running on the surface of the slanting floor, goes into the urine hole 50, and can be brought into a separate urine cask by placing a urine holder underneath the afore-mentioned urine hole. Again, since feces are dropped outside the movable rear frame 41, 141, these can be easily disposed of, thereby the inside of the cage being kept clean always.

(4) This cage can be used by arranging laterally in a series or can be placed up doubly, thereby extending the floor area for raising pigs to be eight heads per 36 square feet.

(5) No strong construction is needed if placed on the top of this cage such material as a zinc roofing.

(6) The handling of this cage such as transportation is very convenient, since it can be easily assembled or disassembled with screws.

Now another embodiment of this invention will be explained. In this embodiment the base frame 29 and the escape preventing means or the back frame 22 are modified. That is, the improvements are made on the installation of a foot stopper and an escape preventer as well as a drawer type of floor which can be expanded or contracted.

Referring now to FIGS. 7 to 15, numerals 51 and 52 relate to the side material of the base frame which is welded with two angle bars so that their section will be shaped as the letter F. Between the two side materials 52 the floor board 30 is spread all over, and between the two side materials 51 the floor board 54 is also spread all over, which as one unit can be moved back and forth, so that it may be taken out or pushed in under the floor 30 and will be simultaneously moved with iron bars 55 and 56, which are equipped in the rear end of the floor 54.

To the iron bar 56 (FIG. 7), the ring 58 (FIG. 10) of the left and right of the basal parts of the foot stopper 57 (FIG. 10) is to be set in so that they may be revolved freely, and the spring 60 is put up between the end of arm 59 and the iron bar 55. At the same time to the iron bar 55 (FIG. 7), the crutch 62 in the left and right end of the escape preventer 61 is to be set in and the other crutch 63 in the upper end is to be set up to the lateral bar 66 which is hung between the left and right frames 23 and 24 of the cage. To the lateral materials 68 in the front and rear of the base frame 9, there are to be set in the rings 67 made at the bottom parts of the left and right frame bars 23 and 24, so that they may be freely moved. These rings 67 can be screwed in at a fixed spot. At the same time, the rings 69 are to be made in the upper end of the both frames 23 and 24 and are to be set in to the lateral material 70 of the front frame 21 of the cage; these rings are movable but are to be screwed in the metal fittings 71 (FIG. 14).

In the front part of the cage a feed bowl, movable back and forth, is to be set in which can be freely taken out or put in through the front window of the cage.

In operation, in the first place, the side bars 23 and 24 are moved inside in order to narrow the width of the cage, and after sending in the floor 54 under the floor 30 and by sending forward the lateral bar 66, the inside area of the cage is made smaller. Then the feed bowl is taken out, and by opening the front door of the cage, a pig is put from its hip part, and then the door is closed and a filled-in feed bowl is inserted.

As the pig grows up gradually inside the cage, the side frames 23 is expanded as well as the lateral bar 66 is moved backwards, so as to widen the inside area of the cage. When a pig wants to make feces it backs and puts its hips to the escape preventer 61, and so feces will fall off underneath the cage; and urine will drop either beneath the cage or on the floor of the cage, which will automatically leak beneath the cage as the floor is made slantwise in the rear.

Another feature of this modification relates to the foot stopper 57, which is a device for making a pig not to do any false step when it draws back. The experiment proves that a pig does not step over this foot stopper 57. Again a pig, when well fed, at once lays down and goes to sleep; and as it puts the foot stopper 57 under its feet, the device is designed that with the action of the weak spring 60 the foot stopper is to be moved underneath, so as not to give any pain to the pig. Though a pig from the first does not escape by stepping over this foot stopper, at times it might do escape as a result of turning restive while placed in the cage at first. Therefore, it is preferred to provide with this escape preventer 61 and make a pig get used to the cage. After about a month or so, take the escape preventer out of the cage; and with just a foot stopper the pig will never escape from the cage, being used to the cage.

In the first place, one of the biggest purposes of the pig raising by cage is to raise the pig well-fed and fat by giving it enough feed but not any excess exercise. For this purpose the inside area of the cage is to be regulated in accordance with the size of the pig, so that there will be no excess space in the cage. At the same time, it is necessary to make its construction and operation as simple as possible. Therefore, it is considered that the foot stopper, the escape preventer and the drawer type floor are all of them quite effective for raising the pig.

Furthermore, it is preferred to provide an automatic dropping type feeder and an automatic water supplier. FIGS. 7 to 9 show such accessories, in which the main body of the automatic dropping type feeder 81 is installed on the upper part of the front door 32 of the cage. At the lower part of this feeder's main body there is to be connected a rubber tube 82 or the like which comes down into a feeding box 83 as far down near the bottom of it. On the other hand, the floor board on the front part of the cage is to be taken out and there is to be fixed the bowl-shaped main body 84 of the automatic water supplier just beneath the feeder 83. Inside the bowl-shaped main body 84 there is to be attached a flat lever 85 with its supporter 86 as the fulcrum, so that when the lever 85 is pushed it opens a water tongue 88 by resisting the spring 87, and water (either city or tanked) will run into the bowl-shaped main body through a rubber hose 89.

In operation, when the granulated prepared feed is put into the feeder, it will come down into the feed box 83 passing through the rubber tube 82. But as the end of the tube 82 hangs down almost to the bottom of the feed box, the feed does not come down all at once. Instead, the feed comes down gradually from above as the pig eats it. When the pig wants to drink water, it pushes forward the feed box 83 with its nose and presses its nose to the lever 85 of the automatic water supplier. Then the spring 87 will be compressed by the lever function and the water valve 88 is to be opened which makes water (either city or tanked) run into the bowl-shaped main body 84 of the automatic water supplier.

By this way, the pig is to drink water to its satisfaction; and when satisfied the pig will immediately lay down in the cage and go to sleep. Soon afterward it will sit up in the cage and want to eat the feed again; but since the feed box has been pushed forward the pig, after drawing it either with its nose or foot, eats the feed to its satisfaction, again pushes the feed box forward with its nose and compresses its nose to the water supplier and drinks water to its contentment; then lays down and goes to sleep. Meanwhile for the purpose of making feces the pig moves back as far as the foot stopper.

Since the pig will repeat this action, the pig raiser only has to supply the feed in the automatic feeder and clean feces and urine; and therefore, he can save troubles on raising pigs. And at the same time, since the pig eats the prepared feed to its contentment and sleeps well, its growth is remarkable and quick.

I have found that, when twenty pigs of 25 kg. on the average was raised in the cages with a composite feed in the market for an experiment, they grew up to an average weight of 80 kg. for 90 days. For the growth of the balance of 55 kc. by weight, 115 kg. by weight of the composite feed was consumed for the 90 day raising. When a pig of 80 kg. by weight was butchered, 53 kg. by weight on the average of good pork was obtained. Adequate thickness of fat or from 1.5 cm. to 3.6 cm. of fat was found when the pigs were butchered. Comparing with the conventional method, growth of a pig up to 80 kg. by weight in accordance with this invention was quicker than it by 80 days.

While particular embodiments of the invention have been illustrated and described, modifications thereof will readily occur to those skilled in the art. It should be understood therefore that the invention is not limited to the particular embodiments disclosed but that the appended claims are intended to cover all modifications which do not depart from the true spirit and scope of the invention.

What is claimed as new and desired to be secured by Letters Patent of the United States is:

1. A pig raising cage comprising, in combination, a base frame; a pair of elongated side frames respectively arranged on opposite sides of said base frame and projecting substantially parallel to each other upwardly therefrom, said side frames being spaced from each other so as to define between themselves an elongated narrow space preventing any substantial transverse movement of a pig placed in the cage; a front frame connected to and extending transversely between one of the ends of said side frames; escape preventing means connected to and extending transversely between said side frames in the region of the other ends thereof for preventing escape of the pig in direction away from said front frame; and feeding means mounted on said front frame of said cage, said feeding means including a food supply means and a water supply means arranged one above the other, the upper one of said means being displaceable in longitudinal direction of said cage through an opening in said front frame between a feeding position inside said cage at the inner side of the front frame and an inactive position substantially outside of said cage at the outer side of said front frame, said upper one of the feeding means preventing in said feeding position access to said lower of said supply means, whereby the pig is forced to move said upper supply means from said feeding position to said inactive position in order to get access to said lower supply means and to move said upper supply means again to said feeding position in order to have again access to said upper supply means.

2. In an elongated narrow pig raising cage preventing any substantial transverse movement of a pig placed thereinto and having a front frame formed with an opening therethrough, in combination, feeding means including a food supply means and a water supply means arranged one above the other, the upper one of said means being displaceable in longitudinal direction of said cage through said opening in said front frame between a feeding position inside said cage at the inner side of the front frame and an inactive position substantially outside of said cage at the outer side of said front frame, said upper one of the feeding means preventing in said feeding position access to said lower of said supply means, whereby the pig is forced to move said upper supply means from said feeding position to said inactive position in order to get access to said lower supply means and to move said upper supply means again to said feeding position in order to have again access to said upper supply means.

3. In an elongated narrow pig raising cage preventing any substantial transverse movement of a pig placed thereinto and having a front frame formed with an opening therethrough, in combination, feeding means including a food supply means comprising a feed box movable longitudinally of the cage through said opening in said front frame between a feeding position to one side of said front frame inside the cage and an inactive position at the other side of said front frame substantially outside said cage; and water supply means arranged within said cage and at a lower level than said feed box and covered by said feed box so as to be inaccessible when said feed box is in said feeding position.

4. In an elongated narrow pig raising cage preventing any substantial transverse movement of a pig placed thereinto and having a front frame formed with an opening therethrough, in combination, feeding means including a food supply means comprising a feed box movable longitudinally of the cage through said opening in said front frame between a feeding position to one side of said front frame inside the cage and an inactive position at the other side of said front frame substantially outside said cage, a hopper carried by said front frame at an elevation higher than said feed box, and gravity feed means for transferring food from said hopper into said feed box; and water supply means arranged within said cage and at a lower level than said feed box and covered by said feed box so as to be inaccessible when said feed box is in said feeding position.

5. An arrangement as defined in claim 4 in which said gravity feed means is in the form of a flexible tube.

6. An arrangement as defined in claim 2 in which said water supply means includes operating means to be moved by the pig in order to supply water.

7. An arrangement as defined in claim 2 in which said water supply means includes a bowl, conduit means communicating with said bowl for feeding water thereinto, valve means in said conduit means movable between an open and a closed position and tending to stay in said closed position, and lever means pivotally mounted in said bowl and operatively connected to said valve means for moving the same to said open position.

8. An arrangement as defined in claim 1 and including means operatively connected to said side frames for changing the spacing between the same; and means operatively connected to said escape preventing means for changing the distance thereof from said front frame so as to decrease the width and length of the cage in accordance with the growth of the pig.

References Cited in the file of this patent

UNITED STATES PATENTS

| | | |
|---|---|---|
| 2,212,549 | Olson et al. | Aug. 27, 1940 |
| 2,602,419 | Johnson | July 8, 1952 |
| 2,653,569 | Forester | Sept. 29, 1953 |
| 2,714,367 | Arnold | Aug. 2, 1955 |
| 2,928,371 | Baker | Mar. 15, 1960 |
| 2,993,471 | Meyer | July 25, 1961 |